(12) United States Patent
Vrhel

(10) Patent No.: US 9,633,461 B2
(45) Date of Patent: Apr. 25, 2017

(54) SYSTEM AND METHOD FOR COLOR MANAGEMENT OF MIXED CONTENT DOCUMENTS

(71) Applicant: Michael Vrhel, Sammamish, WA (US)

(72) Inventor: Michael Vrhel, Sammamish, WA (US)

(73) Assignee: Artifex Software Inc., San Rafael, CA (US)

( * ) Notice: Subject to any disclaimer, the term of this patent is extended or adjusted under 35 U.S.C. 154(b) by 0 days.

(21) Appl. No.: 14/630,044

(22) Filed: Feb. 24, 2015

(65) Prior Publication Data

US 2016/0247051 A1   Aug. 25, 2016

(51) Int. Cl.
*G06T 11/60*   (2006.01)

(52) U.S. Cl.
CPC .................... *G06T 11/60* (2013.01)

(58) Field of Classification Search
CPC combination set(s) only.
See application file for complete search history.

(56) References Cited

U.S. PATENT DOCUMENTS

| | | | | |
|---|---|---|---|---|
| 2004/0135791 A1* | 7/2004 | Krueger | ............... | H04N 1/6072 345/589 |
| 2005/0036164 A1* | 2/2005 | Hiroe | .................... | G06K 15/00 358/1.9 |
| 2011/0116138 A1* | 5/2011 | Li | .................... | G06K 15/1822 358/3.24 |
| 2014/0153057 A1* | 6/2014 | Yaginuma | ........... | G06K 15/1878 358/3.26 |
| 2015/0029524 A1* | 1/2015 | Shin | ................... | G06K 15/1801 358/1.9 |
| 2015/0229894 A1* | 8/2015 | Dietz | .................... | G06T 11/001 345/589 |

* cited by examiner

*Primary Examiner* — Christopher D Wait
(74) *Attorney, Agent, or Firm* — Fitzsimmons IP Law

(57) ABSTRACT

A system and method is provided for color managing different content objects in at least one source file. In one embodiment of the present invention, the system includes a color management module, a rendering module, an interface (e.g., GUI), and a memory module for storing a plurality of color profiles. The interface allows a user to specify different color profiles and/or parameters for different object types. For example, the user can specify different source color spaces to use for the default source color spaces based upon object type. Similarly, the user can specify different output color spaces to use based upon object type. Finally, software can be used to generate a map that specifies the object type(s) that leads to the creation of each individual pixel in the rasterized output. Parameters (e.g., brightness, contrast, etc.) of individual pixels can then be adjusted based on object type and user-defined, object-based settings.

20 Claims, 5 Drawing Sheets

SYSTEM AND METHOD FOR COLOR MANAGEMENT OF MIXED CONTENT DOCUMENTS

COPYRIGHT NOTICE

This patent document contains material subject to copyright protection. The copyright owner has no objection to the reproduction of this patent document or any related materials, as they appear in the files of the Patent and Trademark Office of the United States or any other country, but otherwise reserves all rights whatsoever.

BACKGROUND OF THE INVENTION

1. Field of the Invention

The present invention relates to mixed-content color management or, more particularly, to a system and method for independently managing color (or other display parameters) for different objects within a single page of a document, or within a single frame of a video.

2. Description of Related Art

Page description languages (PDLs) are formats that describe the content of a document. The PDL can describe how to draw a particular graphic, where to place text with a particular font type and where to place an image. Examples of PDLs include Adobe PostScript (PS), PDF, PCL and XPS. These languages are often called vector based document formats.

A rendering engine for page description languages (PDLs) is software that takes the content of a PDL file and creates raster bit map images of each page at a specified resolution. Examples of rendering engines include Ghostscript™ and MuPDF™. The process of converting the pages of a document to bit maps is referred to as rasterizing or rendering.

Within the vector based format for the document, there can exist on a single page a number of different object types. As can be seen in FIG. 3, a page 300 can include, but is not limited to, text 310, graphics 320 and at least one image 330. Typically, within the vector based document format these objects are defined for particular color spaces. For example, a graphic object may be defined to be drawn with particular RGB (Red, Green Blue) values, an image could be defined in a CMYK (Cyan, Magenta, Yellow and Black) color space and a text object may be defined to be drawn with a particular gray level. These color spaces will be referred to as source color spaces.

When a page is rendered, the raster image created by the rendering engine for that page has all of its pixels in a single output color space. This output color space is typically dependent upon the device to which the page is going to be viewed. For example, if you are viewing the page on a computer, tablet, hand-held device, or projector, the output color space would typically be RGB. These devices will be referred to as soft-copy devices. If you were printing the page on a color printer, the most common output color space would be CMYK.

Some PDLs allow the use of transparency when drawing objects. This allows for objects that lie below other objects to be partially visible. FIG. 4 shows an example of a graphic 420, which is semi-transparent and may be of a particular color (e.g., red), that is laid partially over an image 430, which may also be of a particular color (e.g., blue). Then, semi-transparent text 410, which may also be of a particular color (e.g., green), is also laid down over the image 430 and the rectangle 420, thereby creating an overlap between the three. Note that the overlapping region is a blend of a combination of text, graphic and image object source colors.

The most common digital format that is used for defining a color space is the ICC profile. ICC stands for International Color Consortium. The ICC profile can be used in the PDF and XPS formats to define the source colors of objects in the document. In addition, an ICC profile can be used to define the output color space. The ICC profile describes a mapping between a device color space like RGB or CMYK and a color space that relates perceptually to the human visual system.

Software that converts from the source color space to the output (or destination) color space is referred to as the color management module (CMM). LittleCMS™ is an example of a CMM that uses source ICC profiles and destination ICC profiles to convert from source colors to output colors. The conversion of source colors to destination colors by the CMM is usually performed using multi-dimensional look-up-tables (MLUTs). In addition to the color spaces, a CMM often has other parameters that can affect the exact transform that is performed. These include but are not limited to rendering intent, black point compensation and black preservation.

Many objects within a document format like PDF do not use source ICC profiles to define an object color but instead rely upon a generic RGB or CMYK color space. In these cases, a "default" RGB ICC profile can be assigned to the generic RGB source color space and used by the CMM.

Often a document may include multiple objects (i.e., images, graphics and text) that are all colorimetrically defined in terms of the same default RGB color space. In this case, these objects all undergo the same transformation with the CMM from the default RGB color space to the device output RGB color space if viewing with a soft-copy device or to the device output CMYK color space if printing with a printer.

Typically a person viewing a page from such a document would desire to have high contrast black text, highly color saturated graphics and images that are perceptually pleasing and well balanced. Often these goals are conflicting in that the transform to achieve high contrast black text is quite different from that used to achieve a visually pleasing image. As mentioned above, however, it is common to find documents where the source color spaces are the same for different objects leading to the same color transformation being performed for these objects in mapping from source to destination color space.

Because the foregoing methods for managing color can produce objects that are not optimized for viewing, it would be advantageous to provide an improved color management system and method that can generate saturated graphics, black text, and perceptually pleasing images in a rasterized output.

SUMMARY OF THE INVENTION

The present invention provides a system and method for color managing different content objects in at least one source file. Preferred embodiments of the present invention operate in accordance with a color management module ("CMM"), a rendering module ("RM"), and a memory module, wherein the memory module includes color profiles (e.g., ICC profiles), which describe a mapping between a device color space like RGB or CMYK and a color space that relates perceptually to the human visual system.

A preferred embodiment of the present invention further includes an interface (e.g., GUI, etc.), which allows a user to specify different color profiles and/or parameters for different object types. By way of the interface, the user can specify different source color spaces to use for the default source color spaces based upon object type. In addition, the user can specify different output color spaces to use based upon object type. Finally, software can be used to generate a map that specifies the object type(s) that lead to the creation of each individual pixel in the rasterized output. This map, along with the interface, allows further adjustment/processing (e.g., of various parameters, such as brightness, contrast, hue, etc.) after rasterization based upon object type if desired. A particular feature is that this map information is maintained even through the transparency imaging model. That is to say, for example that it would be known if a particular pixel was created by blending an image color with a graphic color. If a particular pixel is mapped to more than one object, user-inputs for both objects can be used to adjust parameters of the pixel after rasterization.

In light of the forgoing there are several specific embodiment of the present invention, including a first embodiment where a user is allowed to specify different profiles (e.g., ICC profiles) to be used for output color spaces for different object types encountered in a source file (e.g., source document, page, PPT, etc.). In other words, the user is allowed to specify a first profile to be used for the output color space for a text object, a second profile to be used for the output color space for a graphic object, etc.

In a second embodiment of the present invention, a user is allowed to specify other parameters that effect color transformations to the CMM based upon different object types. These parameters may include settings that affect color transformation, such as rendering intent, black point compensation and black preservation.

In a third embodiment of the present invention, a user is allowed to specify different profiles (e.g., ICC profiles) to use for source color spaces for different object types encountered in a source file (e.g., source document, page, PPT, etc.). In a fourth and similar embodiment, the user may be allowed to override (or replace) embedded profiles (e.g., ICC profiles) in a source file with different profiles (e.g., ICC profiles) based upon different object types.

In a fifth embodiment, a user is allowed to create a map/image that specifies at each pixel location the type of object(s) that is created in the pixel in the rasterized image at that location. An example implementation is to specify the bit values in an eight bit word at each image pixel location to indicate if a pixel at that spatial location in the actual document page was formed from particular object types. This would in essence create a map that is a gray scale image the same resolution as the document page. The usefulness of this map is that it can be used to assist in performing further color processing of the page based upon object type after the page has already been rasterized.

For example, once the object types are mapped, in accordance with a sixth embodiment of the present invention, a user can adjust at least one parameter (e.g., brightness, contrast, tint, etc.) for each object type. For example, on a television set or a video projector you can typically adjust the hue, saturation, brightness and contrast for the entire image that is displayed. Video projectors are often used to display vector-based presentations that include images, graphics and text (e.g., a PDF slide show, or PPT). On existing devices, a change of one of these controls (i.e., hue, saturation, brightness or contrast) will affect the entire displayed image. Often, increasing the contrast on the unit may result in good text, but poor images. Likewise, increasing the saturation may be good for the graphics but result in poor images. With the software of this invention embedded inside the projector it is possible to have individual controls (e.g., via a GUI) for different object types (e.g., images, graphics, text, etc.). For example, a user can view their presentation on the projector and optimize the saturation for the graphic components in real time without affecting the text or images. Similarly, they can adjust the contrast for the text without affecting the images or graphics. The result is a much improved viewing experience for the user and his/her audience.

A more complete understanding of a system and method for independently managing color (or other display parameters) for different objects within a single page of a document, or within a single frame of a video, will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention provides a system and method for color managing different content objects in at least one source file. In the detailed description that follows, like element numerals are used to describe like elements illustrated in one or more figures.

It should be appreciated that while the invention is described herein in terms of profiles, such as ICC profiles, which are commonly used for defining color mappings, the invention is not limited to this format. Thus, the term profile, as used herein, is used in its broadest sense, to encompass any mapping between a device color space and a perceptual color space based upon the human visual system.

Preferred embodiments of the present invention operate in accordance with a color management module ("CMM"), a rendering module ("RM"), and a memory module.

Figure 1:
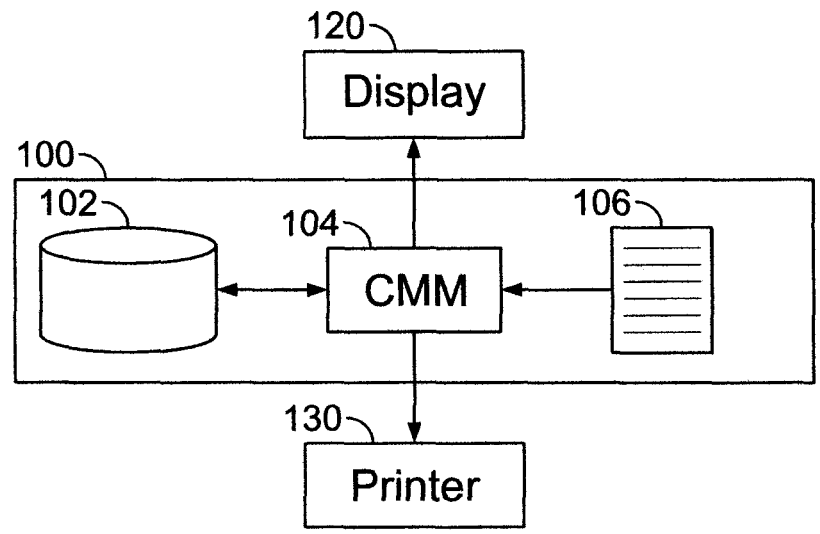
FIG. 1 illustrates a prior art method of managing color between at least one source file and at least one destination file.

As previously discussed, and as shown in FIG. 1, prior art systems (e.g., 100) includes a CMM 104 and a memory module 102 for storing a plurality of profiles, such as ICC profiles. The ICC profiles are used by the CMM 104 to map a source color space from a source file 106 into a destination color space, such as an RGB color space of a display 120, or a CMYK color space of a printer 130. Using a single profile to map a source color space into a destination color space, regardless of the content of the source file, can result in an output that is not visually pleasing to the user.

Figure 2:
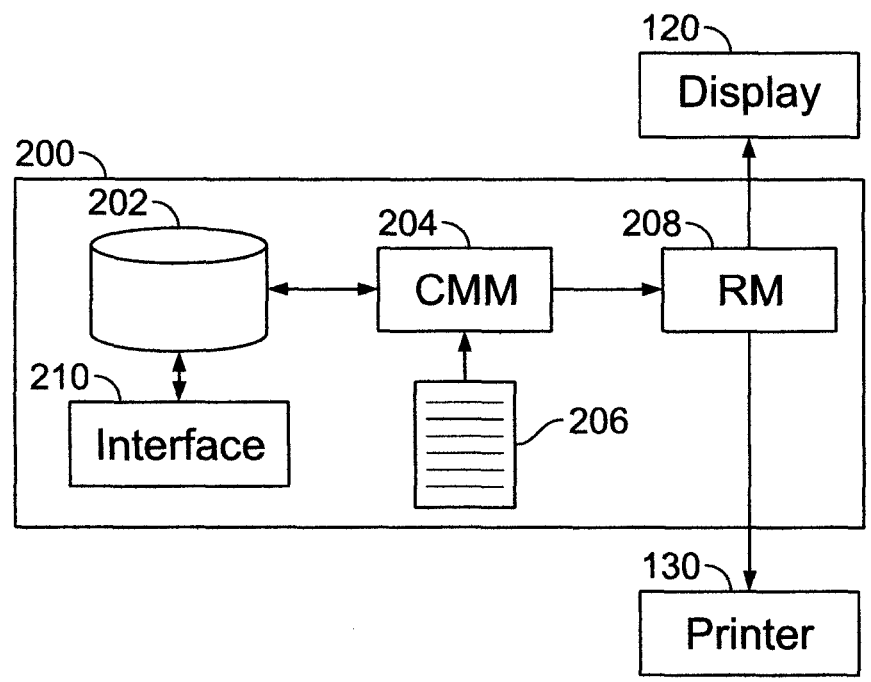
FIG. 2 illustrates, in accordance with one embodiment of the present invention, a system for managing color of different content objects between at least one source file and at least one destination file.
Figure 4:
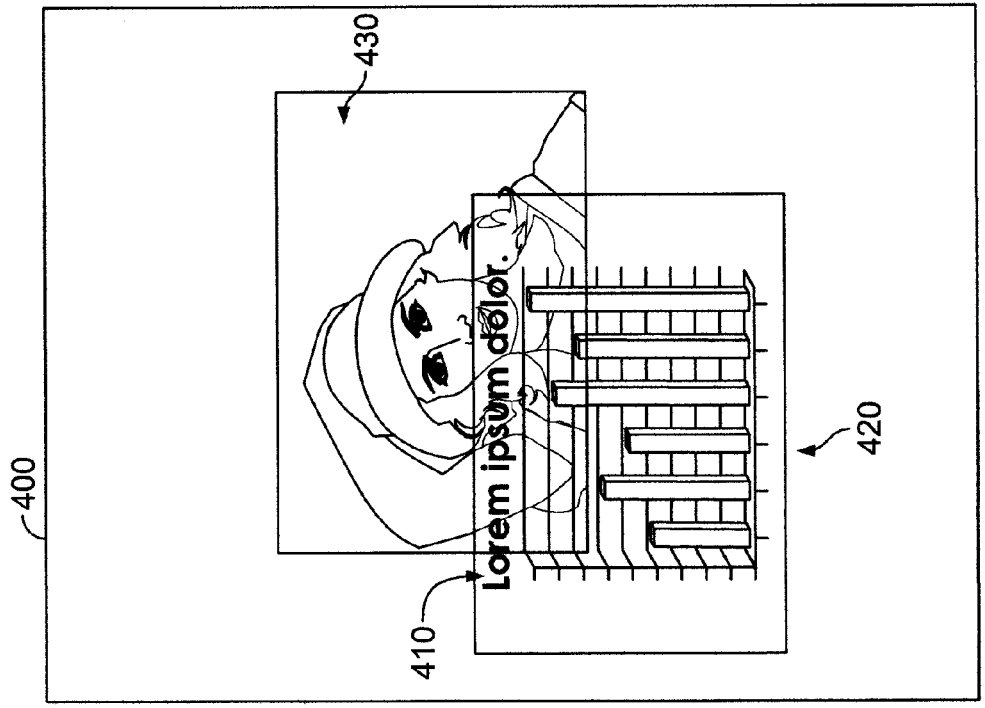
FIG. 4 illustrates different semi-transparent color content objects that can be in a source file (e.g., a document, a page, a PPT, etc.), and how these objects may overlap.
Figure 3:
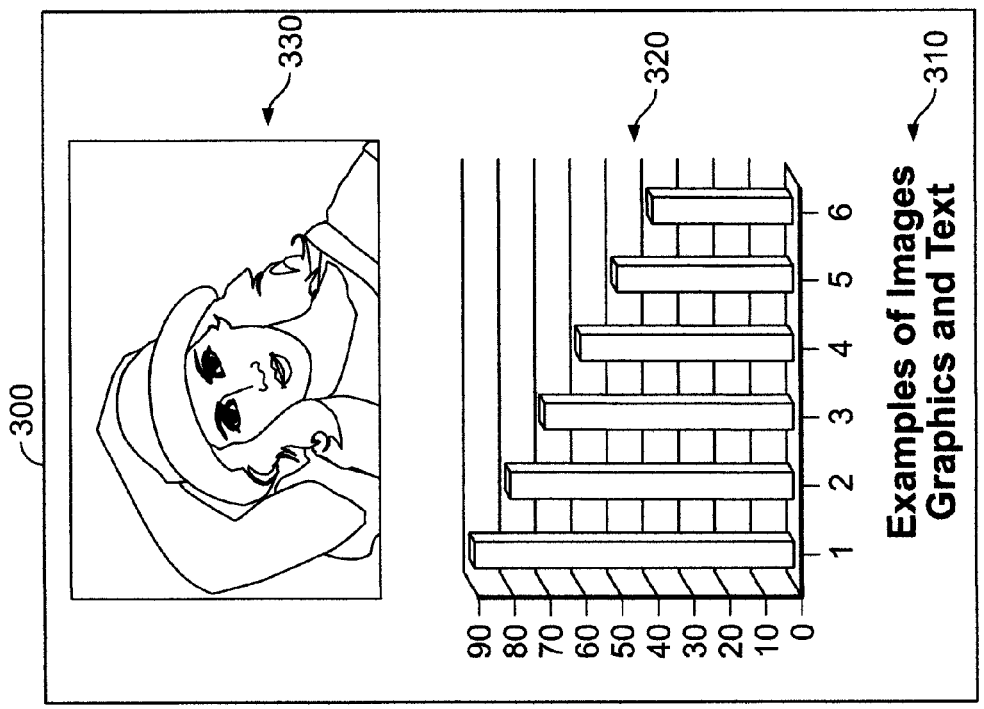
FIG. 3 illustrates different content objects that can be in a source file (e.g., a document, a page, a PPT, etc.)

In one embodiment of the present invention, as shown in FIG. 2, the foregoing problems can be solved using an interface 210, which allows a user to modify mapping (or other parameters, such as brightness, contrast, and the like) based on the content of the source file. For example, such an interface 210 can be used to select different profiles (or other parameters) based on different object types. Details on how the interface 210 can be used to create and/or modify a destination color space and/or a destination file based on different object types are provided below.

It should be appreciated, however, that the present invention is not limited to the system shown in FIG. 2. For example, those of ordinary skill in the art will understand that, for the sake of simplicity, various components that are common to computing systems are not shown in FIG. 2. For this reason, systems that include additional components are within the spirit and scope of the present invention. Further, systems that include fewer or different components are also within the spirit and scope of the present invention. For example, instead of a single memory module, the system may include a plurality of memory modules. By way of another example, a system that includes a processor programmed to perform CMM and/or RM functions, instead of a CMM and/or RM, is within the spirit and scope of the present invention. By way of yet another example, a single component (or chip) that is configured to perform memory module, CMM, and/or RM functions is within the spirit and scope of the present invention. Is should further be appreciated that the interface may comprise a physical device (e.g., knobs that can be turned to adjust/select a particular profile or parameter for a particular object type) or a graphical user interface ("GUI"), which may be displayed on a display, either by itself or over a destination file (e.g., destination document, page, PPT, etc.).

In a first embodiment of the present invention, a user is allowed to specify different profiles (e.g., ICC profiles) to be used for output color spaces for different object types encountered in a source file (e.g., source document, page, PPT, etc.). In other words, the user is allowed to specify a first profile to be used for the output color space for a text object, a second profile to be used for the output color space for a graphic object, etc.

In one particular implementation, this embodiment can be specified by command line options:
    sTextICCProfile=my_device_text_profile.icc
    sGraphicICCProfile=my_device_graphic_profile.icc
    sImageICCProfile=my_device_image_profile.icc
These options specify that the CMM (see, e.g., 204 in FIG. 2) will use the destination color space defined by the ICC profile my_device_text_profile.icc for all text objects, the destination color space defined by the ICC profile my_device_graphic_profile.icc for all graphic objects and the destination color space defined by the ICC profile my_device_image_profile.icc for all image objects in the document.

In a second embodiment of the present invention, a user is allowed to specify other parameters that effect color transformations to the CMM based upon different object types. These parameters may include parameters that affect color transformation, including, but limited to rendering intent, black point compensation and black preservation.

In one particular implementation, this embodiment can be specified by the command line options
    dTextIntent=intent (0, 1, 2, 3)
    dGraphicIntent=intent (0, 1, 2, 3)
    dImageIntent=intent (0, 1, 2, 3)
    sTextBlackPt=0/1
    sGraphicBlackPt=0/1
    sImageBlackPt=0/1
    sTextKPreserve=0/1/2
    sGraphicKPreserve=0/1/2
    sImageKPreserve=0/1/2
These options specify that there are four different rendering intents (0, 1, 2, 3) for this particular CMM; black point compensation is either off or on (0/1) and black preservation is either off or there are two different methods that can used (0/1/2). These capabilities will vary with the CMM. The foregoing command line options illustrate that the user (e.g., user of the rendering engine) can specify that certain parameters can be set based upon the source object type. In other words, when the CMM is handed a color by the rendering image, the CMM also receives information about the object type and will select the appropriate destination color space as well as set the appropriate parameters (e.g., as set by the user) based upon the object type.

In a third embodiment of the present invention, a user is allowed to specify different profiles (e.g., ICC profiles) to use for source color spaces for different object types encountered in a source file (e.g., source document, page, PPT, etc.). In a fourth and similar embodiment, the user may also be allowed to override (or replace) embedded profiles (e.g., ICC profiles) in a source file with different profiles (e.g., ICC profiles) based upon different object types.

In one particular implementation, these embodiments can be specified by the command line option:
    sSourceObjectICC=filename
Contents of this file define what source profiles and settings should be used with different object types. An example implementation of the contents of "filename" is:

| Key | Profile | Intent | BlkPtComp | Override | BlackPreserve |
|---|---|---|---|---|---|
| Graphic CMYK | cmyk_src_graphic.icc | 0 | 1 | 1 | 0 |
| Image CMYK | cmyk_src_image.icc | 0 | 1 | 0 | 0 |
| Text CMYK | cmyk_src_text.icc | 0 | 1 | 0 | 0 |
| Graphic RGB | rgb_source_graphic.icc | 0 | 1 | 0 | |
| Image RGB | rgb_source_image.icc | 0 | 1 | 0 | |
| Text RGB | rgb_source_text.icc | 0 | 1 | 0 | |

The first line identifies a key word of "Graphic CMYK". This key word indicates that the remaining items on this line deal with source objects that happen to be defined as graphics whose source color space in the document is CMYK based. The next item on the same line is the name of an ICC profile "cmyk_src_graphic.icc." This name indicates that this ICC profile should be used as the source color space for CMYK graphic objects in the document. The third item in the line indicates that rendering intent 0 should be used for CMYK graphic objects. The next item, with a value of 1, indicates that black point compensation should be turned on for CMYK graphic objects. The fifth item, with a value of 1, indicates that if a source graphic CMYK object already has an ICC profile defined for it in the document, then the system should not use it and use the profile cmyk_src_graphic.icc instead. The final item with a value of 0 indicates that black preservation should not be used for CMYK graphic objects. The other lines in this file are similarly defined for the other various graphic types defined by the key word.

Figure 5:
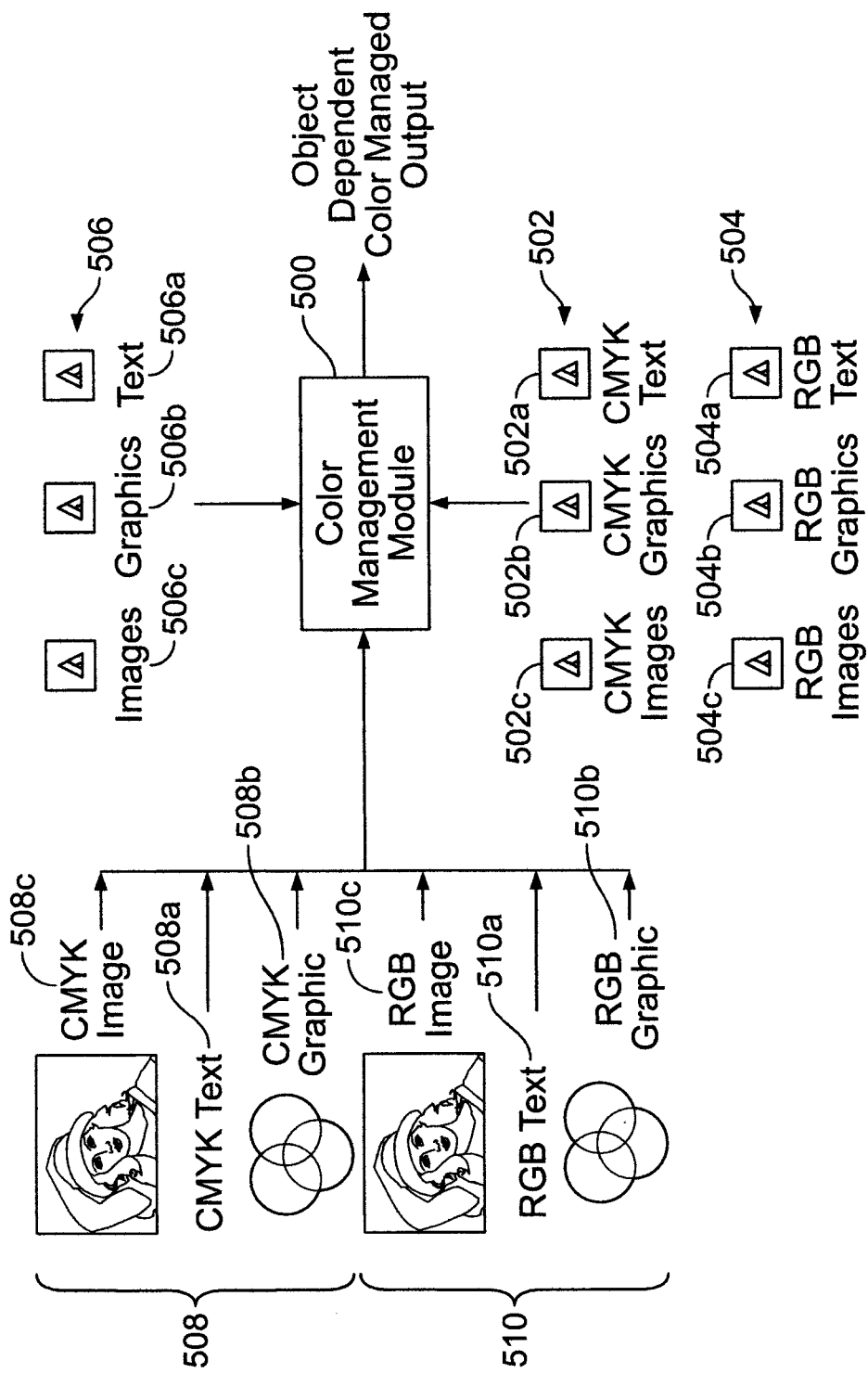
FIG. 5 illustrates, in accordance with one embodiment of the present invention, a system for managing color of different content objects between at least one source file and at least one destination file.

A block diagram showing different color spaces (e.g., CMYK 502 and RGB 504) that can be defined for different object types (e.g., CMYK text 502*a*, CMYK graphics 502*b*, CMYK images 502*c*, RGB text 504*a*, RGB graphics 504*b*, and RGB images 504*c*) is given in FIG. 5. Both the source color space (502, 504) and the destination color space (506) can be specified to the CMM based upon the object type. For example, if the CMM 500 receives a CMYK image color 508*c* to transform, it will use the ICC profile defined by "Source Profile CMYK Images" 502*c* as the source color space and it will use the ICC profile defined by "Destination Profile Images" 506*c* as the destination color space. Other objects types will similarly have their own source and destination ICC profiles.

It should be appreciated that while only variations for image, graphic, and text are shown in FIG. 5, the invention is not limited to only these object types. For example, it may be desirable for other object types, like shadings or patterns, to use their own color spaces in the transformation of their colors.

In a fifth embodiment of the present invention, a user is allowed to create a map/image that specifies at each pixel location the type of object(s) that is created in the pixel in the rasterized image at that location. An example implementation is to specify the bit values in an eight bit word at each image pixel location to indicate if a pixel at that spatial location in the actual document page was formed from particular object types. This would in essence create a map that is a gray scale image the same resolution as the document page.

For example, assume the following conditions are correct:

| Object Type | Bit/Position |
|---|---|
| Graphic | 7 |
| Image | 6 |
| Text | 5 |

Then, graphic-only areas will have a gray value of $2^7=128$ (out of 255), image-only areas will have a gray value of 64, and text-only areas will have a gray value of 32. Areas that are a transparency combination of graphic and image would have a value of 128+64=192. Areas that are a transparency combination of graphic and text would have a value of 128+32=160. Areas that are a combination of image and text would have a gray value of 64+32=96. Areas that are a transparency combination of graphic, image and text would have a gray value of 128+64+32=224. Regions that have no objects drawn would have a gray value of 0 (black).

The usefulness of this map is that it can be used to assist in performing further color processing of the page based upon object type after the page has already been rasterized. Other processing methods that may benefit from this object dependent information include half-toning. The fact that the information is maintained through the transparency imaging model is particularly unique.

In a sixth embodiment of the present invention, a user is allowed to control at least one parameter (e.g., brightness, contrast, tint, etc.) on different object types. By way of this embodiment, it is possible to include the use of parametric color adjustments that effect only particular object types.

For example, on a television set or a video projector you can typically adjust the hue, saturation, brightness and contrast for the entire image that is displayed. Video projectors are often used to display vector-based presentations that include images, graphics and text (e.g., a PDF slide show, or PPT). On existing devices, a change of one of these controls (i.e., hue, saturation, brightness or contrast) will affect the entire displayed image. Often, increasing the contrast on the unit may result in good text, but poor images. Likewise, increasing the saturation may be good for the graphics but result in poor images. With the software of this invention embedded inside the projector it is possible to have individual controls for different object types (e.g., images, graphics, text, etc.). For example, a user can view their presentation on the projector and optimize the saturation for the graphic components in real time without affecting the text or images. Similarly, they can adjust the contrast for the text without affecting the images or graphics. The flexibility provided in this embodiment of the present invention can allow for a much improved viewing experience.

Figure 6:
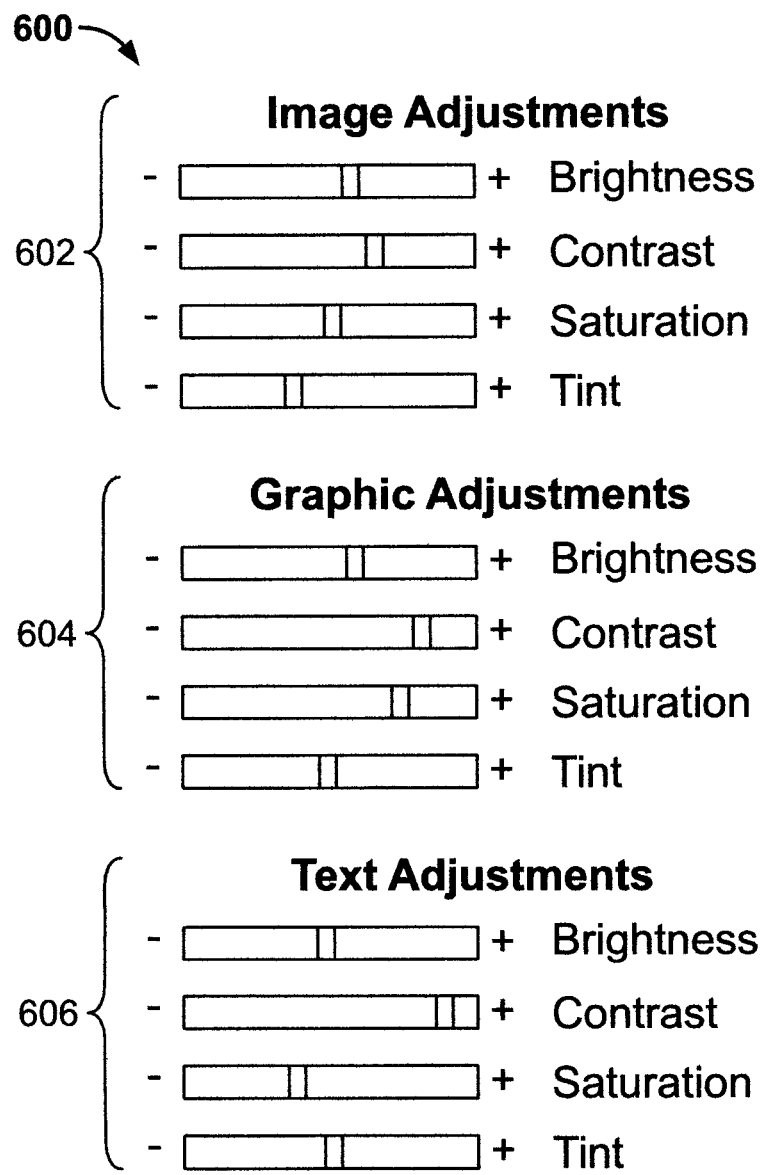
FIG. 6 illustrates, in accordance with one embodiment of the present invention, a graphical user interface, which can be used to manage color of different content objects in at least one destination file.

An example user interface 600 for controlling these different components is shown in FIG. 6. Each of the different object types (e.g., image 602, graphic 604, text 606) has its own controls allowing the user to obtain nice dark text, saturated graphics and perceptually pleasing images. As previously discussed, such an interface could be displayed on the screen itself when dealing with a video projector (e.g., either by itself or superimposed over the actual output). It should be appreciated that while FIG. 6 shows various parameters that can be adjusted, the present invention is equally applicable to all parameters including brightness, contrast, saturation, tint, hue, picture, color, color temperature, sharpness, noise reduction, black corrector, gamma, red, blue, green, and all other parameters generally known to those skilled in the art.

Figure 7:
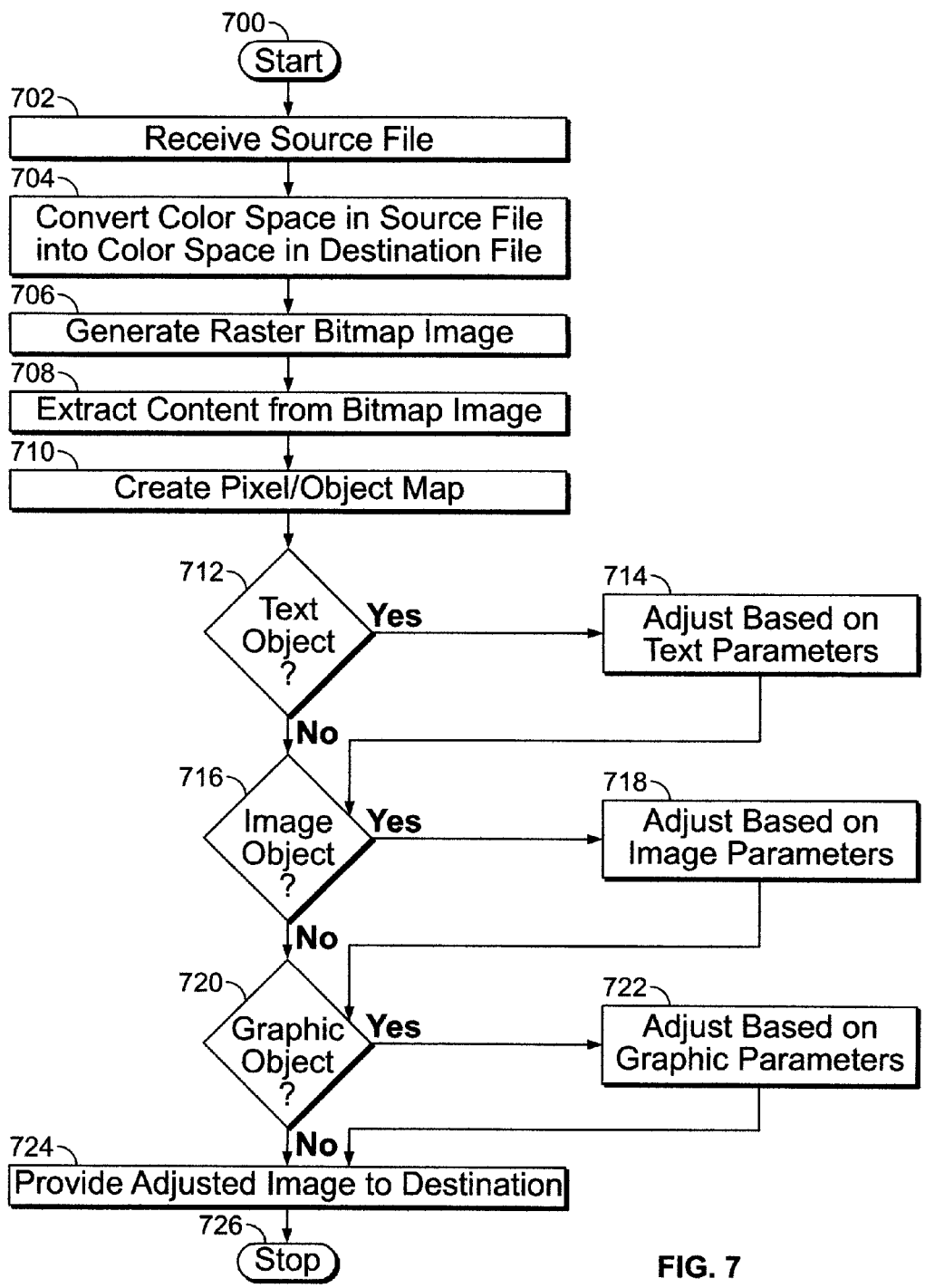
FIG. 7 illustrates, in accordance with one embodiment of the present invention, a method for managing color of different content objects in at least one destination file.

There are a number of different ways that the software can flow to handle object-based color transformations. One such way is shown in FIG. 7, where a source file is received at step 702. The color space in the source file is then converted (or mapped) into a destination color space at step 704. The destination file (having the destination color space) is then used to generate a raster bitmap image at step 706. Contents from the raster bitmap image are then extracted at step 708, and a pixel/object map is create at step 710. In other words, each pixel is mapped to at least one object (e.g., either a single object or multiple objects where there is overlap between more than one object). If it is determined that there are text objects within the raster bitmap image at step 712, then the corresponding pixels (e.g., text pixels) are adjusted based on the user-defined text parameters at step 714. Similarly, if it is determined that there are image objects within the raster bitmap image at step 716, then the corresponding pixels (e.g., image pixels) are adjusted based on the user-defined image parameters at step 718. Finally, if it is determined that there are graphic objects within the raster bitmap image at step 720, then the corresponding pixels (e.g., graphic pixels) are adjusted based on the user-defined graphic parameters at step 722. The adjusted image can then be provided to a particular destination (e.g., display, printer, etc.).

It should be appreciated that the present invention is not limited to the method illustrated in FIG. 7. For example, methods that included different steps (e.g., additional steps, fewer steps, etc.) are within the spirit and scope of the present invention. Similarly, methods where the steps are performed in different orders is also within the spirit and scope of the present invention.

Having thus described several embodiments of a system and method for independently managing color (or other display parameters) for different objects within a single page of a document, or within a single frame of a video, it should be apparent to those skilled in the art that certain advantages of the system and method have been achieved. It should also be appreciated that various modifications, adaptations, and alternative embodiments thereof may be made within the scope and spirit of the present invention. The invention is solely defined by the following claims.

What is claimed is:

1. An apparatus for color management of different content objects, comprising:
    at least one memory device for storing at least one source file;
    a graphical user interface (GUI) allowing a user of said apparatus to adjust a plurality of parameters for a plurality of types of a plurality of objects, said plurality of parameters being stored in said at least one memory device;
    a color management module configured to convert source data in said at least one source file from at least one source color space into at least one destination color space, said converted source data being stored in at least one destination file on said at least one memory device; and
    a rendering module in communication with said at least one memory device, the rendering module being configured to:
        receive said at least one destination file from said at least one memory device, said at least one destination file having content comprising said plurality of objects;
        generate at least one raster bit map image from said at least one destination file;
        identify said plurality of objects in said at least one raster bit map image;
        generate a pixel/object map by assigning a value to individual pixels within said at least one raster bit map image, wherein a first value indicates the presence of a first one of said plurality of types of said plurality of objects, a second value indicates the presence of a second one of said plurality of types of said plurality of objects, and a third value indicates the presence of both said first and second ones of said plurality of types of said plurality of objects;
        adjust said individual pixels within said at least one raster bit map image having said first value in accordance with said plurality of parameters for said first one of said plurality of types of said plurality of objects, said individual pixels within said at least one raster bit map image having said second value in accordance with said plurality of parameters for said second one of said plurality of types of said plurality of objects, and adjust said individual pixels within said at least one raster bit map image having said third value in accordance with said plurality of parameters for both said first and second ones of said plurality of types of said plurality of objects; and
        provide said adjusted raster bit map to a display;
    wherein said first one of said plurality of types of said plurality of objects is a text object, said second one of said plurality of types of said plurality of objects is a graphics object, said plurality of parameters includes at least brightness and contrast, and said GUI is displayed on said display and allows said user to adjust in real-time at least said brightness and said contrast for said plurality of types of said plurality of objects while said adjusted raster bit map is provided on said display; and
    wherein real-time adjustments of said individual pixels within said raster bit map image having said first value are a function of at least said user-adjustable brightness and contrast for said text object, real-time adjustments of said individual pixels within said raster bit map having said second value are a function of at least said user-adjustable brightness and contrast for said image object, and real-time adjustments of said individual pixels within said raster bit map image having said third value are a function of at least said user-adjustable brightness and contrast for both said text and image objects.

2. The apparatus of claim 1, wherein said plurality of parameters further includes at least saturation.

3. The apparatus of claim 1, wherein said plurality of parameters further includes at least tint.

4. The apparatus of claim 2, wherein said plurality of parameters further includes at least tint.

5. The apparatus of claim 1, wherein said plurality of parameters further includes at least sharpness.

6. The apparatus of claim 1, wherein said plurality of parameters further includes at least color.

7. The apparatus of claim 1, wherein said rendering module is further configured to:
    adjust said individual pixels within said at least one raster bit map image having a fourth value in accordance with said plurality of parameters for a third one of said plurality of types of said plurality of objects;
    wherein said third one of said plurality of types of said plurality of objects is an image object.

8. The apparatus of claim 1, wherein said color management module is further configured to use at least one international color consortium (ICC) profile to convert said source data from at least one source color space into said at least one destination color space, and said rendering module is further configured to provide said adjusted raster bit map to a video projector device.

9. The apparatus of claim 1, wherein said GUI is overlaid on said adjusted bit map.

10. The apparatus of claim 1, wherein said GUI replaces said adjusted bit map on said display.

11. A method for color management of different content objects, comprising:
    storing at least one source file in at least one memory device;
    receiving from a user via a graphical user interface (GUI) a plurality of parameters for a plurality of types of a plurality of objects, said plurality of parameters being stored in said at least one memory device and comprising at least brightness and contrast;
    converting data in at least one source file from at least one source color space into at least one destination color space, said converted data being stored in at least one destination file in said at least one memory device and including content comprising said plurality of objects;
generating at least one raster bit map image from said at least one destination file;
identifying said plurality of objects in said at least one raster bit map image;
generating a pixel/map object by assigning a value to individual pixels within said at least one raster bit map image, wherein a first value represents a text object, a second value represents a graphics object, and a third value represents both said text and image objects;
adjusting in real-time said individual pixels within said at least one raster bit map image having said first value in accordance with at least user-adjustable brightness and contrast for said text object;
adjusting in real-time said individual pixels within said at least one raster bit map image having said second value in accordance with at least user-adjustable brightness and contrast for said image object;
adjusting in real-time said individual pixels within said at least one raster bit map image having said third value in accordance with at least user-adjustable brightness and contrast for both said text and image objects; and
providing said adjusted raster bit map to a display.

12. The method of claim 11, wherein said plurality of parameters further includes at least saturation.

13. The method of claim 12, wherein said plurality of parameters further include at least tint.

14. The method of claim 11, wherein said plurality of parameters further includes at least color.

15. The method of claim 11, wherein said plurality of parameters further includes at least sharpness.

16. The method of claim 14, further comprising the step of adjusting said individual pixels within said at least one raster bit map image having a fourth value in accordance with a plurality of parameters for an image object.

17. The method of claim 11, wherein said step of converting said data from said at least one source color space in said at least one source file into at least one destination color space in said at least one destination file further comprises using at least one international color consortium (ICC) profile to convert said data from said at least one source color space into said at least one destination color space.

18. The method of claim 11, further comprising the step of overlaying said GUI on said raster bit map image.

19. The method of claim 11, wherein said step of converting said data from said at least one source color space into said at least destination color space further comprises converting said data from said at least one source color space into a color space for a video projector, said step of providing said adjusted raster bit map to a destination further comprises providing said adjusted raster bit map to said video projector.

20. An apparatus for color management of different content objects, comprising:
A graphical user interface (GUI) allowing a user to adjust a plurality of parameters for a plurality of types of a plurality of objects, said plurality of types of said plurality of objects comprising at least a text object, a graphics object, and an image object, and said plurality of parameters comprising at least a brightness parameter, a contrast parameter, and tint parameter;
a color management module configured to convert data from at least one source color space in at least one source file into at least one destination color space in at least one destination file, said at least one destination file having content comprising said plurality of objects; and
a rendering module configured to:
generate at least one raster bit map image from said at least one destination file;
identify said plurality of objects in said at least one raster bit map image;
generate a pixel/object map by assigning a value to individual pixels within said at least one raster bit map image, wherein a first value indicates the presence of said first one of said plurality of types of said plurality of objects, a second value indicates the presence of said second one of said plurality of types of said plurality of objects, a third value indicates the presence of said third one of said plurality of types of said plurality of objects; and a fourth value indicates the presence of at least two of the first, second and third types of said plurality of objects;
adjust said pixels within said at least one raster bit map image assigned to said first value in accordance with said plurality of parameters for said text object, adjust said pixels within said at least one raster bit map image assigned to said second value in accordance with said graphics object said pixels within said at least one raster bit map image assigned to said third value in accordance with said image object, and adjust said pixels within said at least one raster bit map image assigned to said fourth value in accordance with at least two of said text object, said graphics object, and said image object; and
provide said adjusted raster bit map to a display;
wherein said GUI is displayed on said display and allows said user to adjust in real-time at least said brightness, contrast, and tint parameters for said plurality of types of said plurality of objects; and
wherein real-time adjustments of said individual pixels within said raster bit map image having said first value are a function of at least said user-adjustable brightness, contrast, and tint parameters for said text object, real-time adjustment of said individual pixels within said raster bit map image having said second value are a function of at least said user-adjustable brightness, contrast, and tint parameters for said graphics object, real-time adjustment of said individual pixels within said raster bit map image having said third value are a function of at least said user-adjustable brightness, contrast, and tint parameters for said image object, and real-time adjustment of said individual pixels within said raster bit map image having said fourth value are a function of at least said user-adjustable brightness, contrast, and tint parameters for said at least two of said text object, said graphics object, and said image objects.

* * * * *